(12) United States Patent
Dou et al.

(10) Patent No.: US 8,380,722 B2
(45) Date of Patent: Feb. 19, 2013

(54) USING ANCHOR TEXT WITH HYPERLINK STRUCTURES FOR WEB SEARCHES

(75) Inventors: Zhicheng Dou, Beijing (CN); Junyan Chen, Beijing (CN); Ruihua Song, Beijing (CN); Ji-Rong Wen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 12/748,903

(22) Filed: Mar. 29, 2010

(65) Prior Publication Data
US 2011/0238644 A1    Sep. 29, 2011

(51) Int. Cl.
*G06F 17/30* (2006.01)

(52) U.S. Cl. .......................... 707/748; 707/706; 715/241

(58) Field of Classification Search .................. 707/706, 707/713, 714, 716, 723, 726, 727–730, 739, 707/748–750, 759, 765, 769, 800, 810, E17.108, 707/999.003, 999.1; 715/205, 234, 206, 715/208, 209, 230, 231, 232, 233, 236, 241, 715/249, 751, 253, 700
See application file for complete search history.

(56) References Cited

U.S. PATENT DOCUMENTS

| | | |
|---|---|---|
| 7,260,573 B1 | 8/2007 | Jeh et al. |
| 7,469,251 B2 | 12/2008 | Li et al. |
| 7,496,581 B2 | 2/2009 | Nomiyama et al. |
| 2008/0215563 A1 | 9/2008 | Shi et al. |
| 2009/0083270 A1* | 3/2009 | Kraft et al. .................. 707/7 |
| 2010/0131563 A1* | 5/2010 | Yin .............................. 707/794 |
| 2010/0318533 A1* | 12/2010 | Novak et al. ................. 707/759 |

OTHER PUBLICATIONS

Amitay, Paris, "Automatically Summarising Web Sites—Is There a Way Around It?", retrieved on Dec. 28, 2009 at <<http://reference.kfupm.edu.sa/content/a/u/automatically_summarising_web_sites_is_61376.pdf>>, ACM Proceedings of Conference on Information and Knowledge Management (CIKM), 2000, pp. 173-179.

Brin, Page, "The Anatomy of a Large-Scale Hypertextual Web Search Engine", retrieved on Dec. 28, 2009 at <<http://www.math.upenn.edu/~kazdan/210/210F08/LectureNotes/Google/Brin-Page.pdf, Elsevier Science Publishers, Amsterdam, Computer Networks and ISDN Systems, vol. 30, Issue 1-7, Apr. 1998, pp. 107-117.

Broder, "A taxonomy of web search", retrieved on Dec. 28, 2009 at <<http://www.cis.upenn.edu/~nenkova/Courses/cis430/p3-broder.pdf, ACM SIGIR Forum, vol. 36, Issue 2, 2002, pp. 3-10.

Burges, Shaked, Renshaw, Lazier, Deeds, Hamilton, Hullender, "Learning to Rank using Gradient Descent", retrieved on Dec. 28, 2009 at <<http://www.machinelearning.org/proceedings/icml2005/papers/012_LearningToRank_BurgesEtAl.pdf, ACM Proceedings of Conference on Machine Learning, vol. 119, 2005, pp. 89-96.

Chen, Liu, Wenyin, Pu, Ma, "Building a Web Thesaurus from Web Link Structure", retrieved on Dec. 28, 2009 at <<http://elvis.slis.indiana.edu/irpub/SIGIR/2003/pdf12.pdf, ACM Proceedings of Conference on Research and Development in Informaion Retrieval (SIGIR), Jun. 28, 2003, pp. 48-55.

(Continued)

*Primary Examiner* — Greta Robinson
(74) *Attorney, Agent, or Firm* — Lee & Hayes, PLLC (57) ABSTRACT

This document describes tools for adjusting anchor text weight to provide more relevant search engine results. Specifically, these tools take advantage of a site-relationship model to consider relationships not only between an anchor text source site and a destination page but also relationships between multiple anchor text source sites to improve web searches. Consideration of these relationships aids in determining a new an anchor text weight, which in turn results in more relevant search results.

20 Claims, 6 Drawing Sheets

OTHER PUBLICATIONS

Craswell, Hawking, Robertson, "Effective Site Finding using Link Anchor Information", retrieved on Dec. 28, 2009 at <<http://research.microsoft.com/en-us/um/people/nickcr/pubs/craswell_sigir01.pdf>>, ACM Conference on Research and Development in Information Retrieval (SIGIR), Sep. 9, 2001, pp. 250-257.

Eiron, McCurley, "Analysis of Anchor Text for Web Search", retrieved on Dec. 28, 2009 at <<http://webdocs.cs.ualberta.ca/~tszhu/webmining/paper/search/eiron03analysis.pdf, ACM Proceedings of Conference on Research and Development in Information Retrieval (SIGIR), Posters, 2003 (copyright 2002), pp. 459-460.

Fujii, Itou, Akiba, Ishikawa, "Exploiting Anchor Text for the NavigationalWeb Retrieval at NTCIR-5", retrieved on Dec. 28, 2009 at <<http://research.nii.ac.jp/~ntcadm/workshop/OnlineProceedings5/data/WEB/NTCIR5-WEB-FujiiA.pdf>>, Proceedings of NTCIR-5 Workshop Meeting, Dec. 6, 2005, pp. 455-462.

Fujii, "Modeling Anchor Text and Classifying Queries to Enhance Web Document Retrieval", retrieved on Dec. 28, 2009 at <<http://www.cse.unsw.edu.au/~cs9318/09s1/lect/fujiiWWW2008-paper.pdf, ACM Conference on World Wide Web (IW3C2), Search: query analysis, Apr. 21, 2008, pp. 337-346.

Jarvelin, Kekalainen, "IR evaluation methods for retrieving highly relevant documents", retrieved on Dec. 28, 2009 at <<http://www.cse.iitb.ac.in/~ganeshwagle/ebooks/web_mining/course_papers/10-2/JarvelinK2000ndcg.pdf>>, ACM Proceedings of Conference on Research and Development in Information Retrieval (SIGIR), 2000, pp. 41-48.

Kleinberg, "Authoritative Sources in a Hyperlinked Environment", retrieved on Dec. 28, 2009 at <<http://acmserver.cs.ucr.edu/~rrusich/dbquals/%5B06%5Dauthoritative%20sources%20in%20a%20hyperlinked%20environment.pdf>>, ACM Proceedings of Symposium on Discrete Algorithms, 1998, pp. 1-34.

Kolda, Bader, "The TOPHITS Model for Higher-Order Web Link Analysis", retrieved on Dec. 28, 2009 at <http://csmr.ca.sandia.gov/~tgkolda/pubs/bibtgkfiles/SDM06-LACS-preprint.pdf>>, Proceedings of SIAM Data Mining Conference Workshop on Link Analysis, Counterterrorism and Security, 2006, pp. 1-12.

Kraaij, Westerveld, Hiemstra, "The Importance of Prior Probabilities for Entry Page Search", retrieved on Dec. 28, 2009 at <<http://elvis.slis.indiana.edu/irpub/SIGIR/2002/pdf6.pdf>>, ACM Proceedings of Conference on Research and Development in Information Retrieval, Web Information Retrieval, Aug. 11, 2002, pp. 27-34.

Kraft, Zien, "Mining Anchor Text for Query Refinement", retrieved on Dec. 28, 2009 at <<http://wwwconference.org/www2004/docs/1p666.pdf>>, ACM Proceedings of Conference on World Wide Web (WWW), Query result processing, 2004, pp. 666-674.

Lee, Liu, Cho, "Automatic Identification of User Goals in Web Search", retrieved on Dec. 28, 2009 at <<http://www.www2005.org/cdrom/docs/p391.pdf>>, ACM Proceedings of Conference on World Wide Web (WWW), User-focused search and crawling, May 10, 2005, pp. 391-400.

Liu, Chin, Ng, "Mining Topic-Specific Concepts and Definitions on the Web", retrieved on Dec. 28, 2009 at <<http://www.cs.uic.edu/~liub/publications/WWW-2003.pdf>>, Acm Proceedings of Conference on World Wide Web, Writing the web, May 20, 2003, pp. 251-260.

Lu, Chien, Lee, "Anchor Text Mining for Translation of Web Queries: A Transitive Translation Approach", retrieved on Dec. 28, 2009 at <<http://front.cc.nctu.edu.tw/Richfiles/12403-ACMTOIS2003.pdf>>, ACM Transactions on Information Systems (TOIS), vol. 22, Issue 2, Apr. 2004, pp. 242-269.

Pokorny, "Web Searching and Information Retrieval", retrieved on Dec. 28, 2009 at <<http://ieeexplore.ieee.org/stamp/stamp.jsp?tp=&arnumber=1306944&isnumber=29014>>, IEEE Computer Society, Computing in Science and Engineering, vol. 6, No. 4, 2004, pp. 43-48.

Ponte, Croft, "A Language Modeling Approach to Information Retrieval", retrieved on Dec. 28, 2009 at <<http://www.doc.ic.ac.uk/~jmag/classic/1998.A%20languag%20modelling%20approach-%20to%20information%20retrieval.pdf>>, ACM Proceedings of Conference on Research and Development in Information Retrieval (SIGIR), 1998, pp. 275-281.

Robertson, Walker, Jones, Hancock-Beaulieu, Gatford, "Okapi at TREC-3", retrieved on Dec. 28, 2009 at <<http://research.microsoft.com/pubs/67649 1okapi_trec3.pdf>>, NIST Gaithersburg, Overview of the Third Text REtrieval Conference (TREC-3), Jan. 1995, pp. 109-126.

Robertson, Zaragoza, Taylor, "Simple BM25 Extension to Multiple Weighted Fields", retrieved on Dec. 28, 2009 at <<http://www.dcs.qmul.ac.uk/~ywang/download/p42-robertson.pdf>>, ACM Proceedings of Conference on Information and Knowledge Management (CIKM), IR-1 (information retrieval): information retrieval models, Nov. 8, 2004, pp. 42-49.

Salton, Buckley, "Term-Weighting Approaches in Automatic Text Retrieval", retrieved on Dec. 28, 2009 at <<http://comminfo.rutgers.edu/~muresan/551_IR/Resources/Docs/ipmSalton1988.pdf>>, Pergamon Press, Information Processing and Management, vol. 24, No. 5, 1988, pp. 513-523.

Voorhees, "The TREC-8 Question Answering Track Report", retrieved on Dec. 28, 2009 at <<http://comminfo.rutgers.edu/—muresan/IR/TREC/Proceedings/t8_proceedings/papers/qa_report.pdf>>, Proceedings of TREC-8. 2000, pp. 77-82.

Westerveld, Kraaij, Hiemstra, "Retrieving Web Pages using Content, Links, URLs and Anchors", retrieved on Dec. 28, 2009 at http://trec.nist.gov/pubs/trec10/papers/TNO-UTwente-trec10-final.pdf>>, NIST Gaithersburg, Text Retrieval Conference (TREC 2001), 2001, pp. 663-672.

\* cited by examiner

USING ANCHOR TEXT WITH HYPERLINK STRUCTURES FOR WEB SEARCHES

BACKGROUND

Search engines serve to locate information both on the World Wide Web and off. For example, search engines search for documents (or other items) with keywords and return a list of the documents where the keyword was found. Search engines routinely index billions of documents in this manner, which gives users a way to find documents by entering a keyword search query.

However, search engines do not always return the most relevant results in order. A user may enter a search query with a specific intent of the results she wants, but often times the desired documents are not highly ranked. In some instances, this problem stems from the method in which search engines rank documents and the manner in which webpage developers alter their webpages to take advantage of this ranking method. For instance, search engines may rank documents based on the content of the pages (e.g. webpage text) as well as according to anchor texts linking to the documents. Anchor text comprises the visible clickable text in a hyperlink.

When scoring webpages, previous attempts have assumed that the anchor text links between a source site and a destination site are independent from one another, and each individual anchor text link is of equal importance. As a result, these previous attempts assumed that the more incoming links a document has, the more important it is when ranking the document against a search query. This assumption frequently leads to poor search results due to the web developer's ability to effectively game the system.

One such instance where this assumption provides poor search results is in the case of mirror sites. For example poor results occur if two anchor text links come from a single source website or from two identical source web pages on mirror sites. Another instance is when two anchor text links come from two websites having cooperative relationships. These websites are frequently under the control of the same or related users and thusly tend to have a substantial number of the same or similar anchor text links. Yet another instance occurs when anchor text links are purposely created to boost the ranking of the destination page in a web search, as discussed above.

While existing search engine technology has proven very useful, there remains ample room for improvement of search engine technology in regards to adjusting the weight of anchor texts.

SUMMARY

This document describes tools for adjusting the weight assigned to anchor texts found in each item of a set of items (e.g., documents) to provide more relevant search engine results. Specifically, these tools take advantage of a site-relationship model to consider relationships not only between an anchor text source site and a destination site, but also relationships between multiple anchor text source sites. Considering these relationships aids in determining a new an anchor text weight which provides more relevant search results.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes tools for adjusting anchor text weight to provide more relevant search engine results. Specifically, these tools take advantage of a site-relationship model to consider relationships not only between a site that includes the anchor text ("an anchor text source site") and a site to which the hyperlink associated with the anchor text links to ("a destination site"). These tools also take into account relationships between multiple anchor text source sites to improve web searches. Considering these relationships aids in determining a new an anchor text weight, which provides more relevant search results to a user.

This site-relationship model assumes that different source and destination site relationships may affect the anchor text weights used for inferring the authority (or relevancy) of a destination page. In other words, unlike previous methods, the assumption is not made that each anchor text is independent and of equal value. This traditional approach simply uses the frequency of an anchor text to infer relevancy of the anchor texts. However, this assumption often does not correctly indicate that a destination page is more or less relevant. For instance, if a page on a source site includes multiple hyperlinks with a same anchor text that each link to a same page on a destination site, traditional search engine techniques would find the page on the destination site highly relevant to the anchor text (which may be issued by users as a query)—despite the duplicated anchor texts.

As introduced above, the techniques described herein leads to better search results by considering two relationships. The first relationship is a relationship between the anchor text destination site and the anchor text source site. Specifically, the site-relationship model described herein assumes that a source site that is dependent on a destination site provides unreliable anchor weights. When a source site is dependent on a destination site, the hyperlinks between them may be purposely created and anchor texts used by these links may not be credible descriptions about destination page. In response to this dependency, the plurality of anchor text linking from the source site pointing to the destination site is reduced in weight.

The second relationship this model considers is a relationship between source sites. Specifically, in the site-relationship model, it is assumed that anchor text source sites that are dependent on other source sites should have their anchor weights adjusted. Here, a source site is dependent on another source site if the websites that both of these source sites link to strongly overlap with one another. For example, suppose that multiple websites s1 and s2 link to a specific page d. If website s1 links to similar web pages or websites to the set of websites pointed to by site s2, then the model assumes that s1 and s2 are dependent and cooperative, as they are linking to similar set of sites. The model herein reduces their weights based on this overlap. On the web, spammers usually create a large number of source sites, and generate links in these sites to point to a set of destination sites (which pay money to the spammers). In this case, the site-relationship model can detect the dependencies between source sites and reduce their weights for anchor texts.

The described tools, therefore, provide for a method to reflect the true indication of the relevance of anchor texts. This is accomplished by reflecting these relationships between source and destination site and by discounting the anchor text weights in certain relationships.

The discussion begins with a first section entitled "Illustrative Architecture", which describes one non-limiting environment that may implement the claimed tools. A second section, entitled "An Introduction to Anchor Texts and Example Refinement Engine", discusses non-limiting examples of anchor texts and their use in a non-limiting refinement engine. A third section entitled "Anchor Documents", describes a non-limiting embodiment involving anchor documents. A fourth section entitled "Site-Relationship Model" follows and describes a relationship model that, when used, helps produce better search results in response to receiving a search query. A section entitled "Illustrative Processes" follows and describes processes for adjusting the weight of anchor texts illustrated in the architecture of FIG. 1 as well as other architectures. A brief conclusion then ends the discussion.

This brief introduction, including section titles and corresponding summaries, is provided for the reader's convenience and is not intended to limit the scope of the claims, nor the proceeding sections.

Illustrative Architecture

Figure 1:
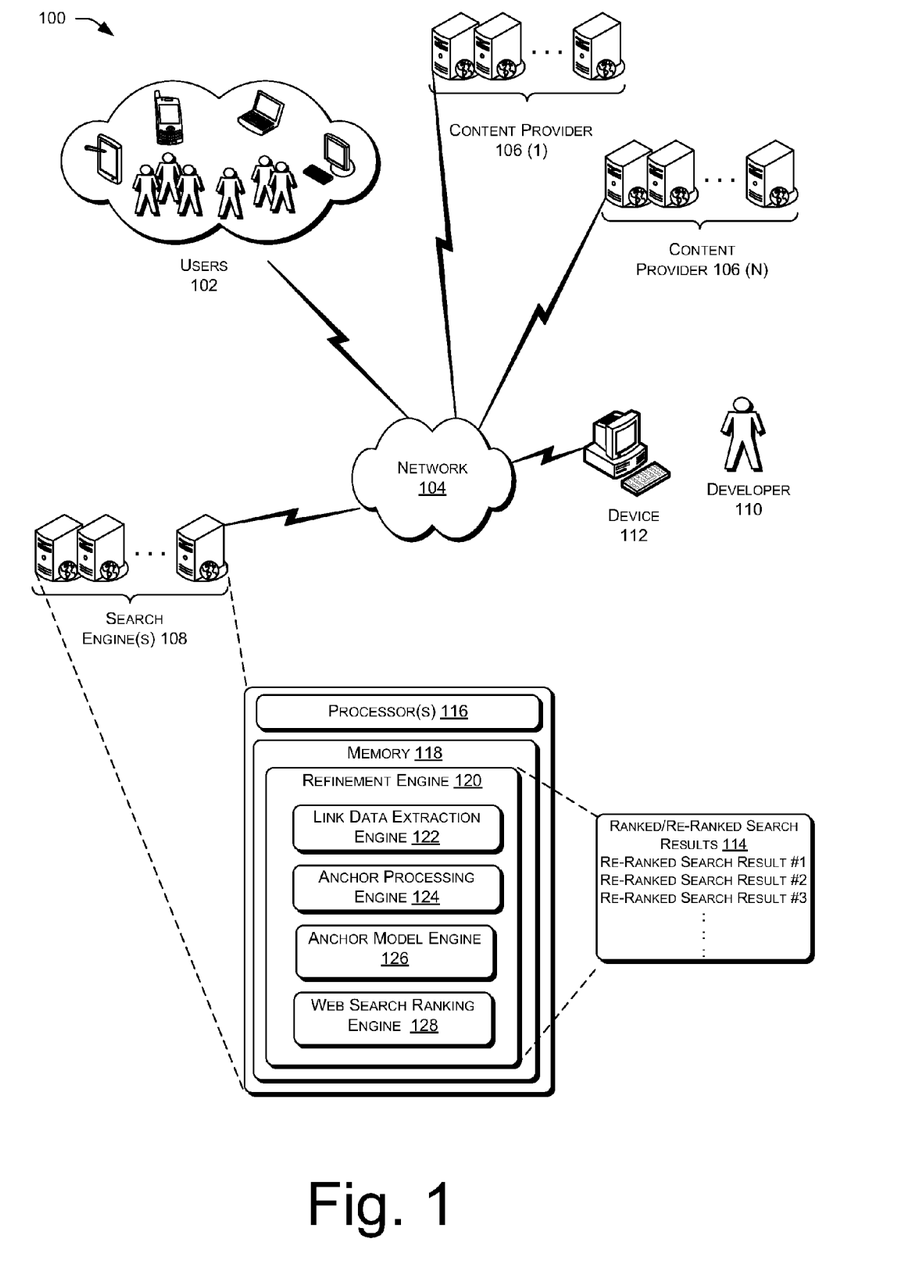
FIG. 1 depicts an illustrative architecture in which a refinement engine adjusts the weight of anchor texts in one or more documents to facilitate better search results for users employing a search engine.

FIG. 1 depicts an illustrative architecture 100 that may employ the described techniques. As illustrated, FIG. 1 includes one or more users 102 each operating respective computing devices for the purpose of using search engines and uploading and downloading content over a network 104. The computing devices may comprise any sort of device capable of using search engines and uploading and downloading content. For instance, the devices may include personal computers, laptop computers, mobile phones, set-top boxes, game consoles, personal digital assistants (PDAs), portable media players (PMPs) (e.g., portable video players (PVPs) and digital audio players (DAPs)), and the like. Note that network 104, which couples the user computing devices, may comprise the Internet, a Local Area Network (LAN), a Wide Area Network (WAN), a wireless network, and/or the like.

Additionally, FIG. 1 illustrates content providers 106(1), . . . , 106(N) and search engine(s) 108. Content providers 106 (1) and 106 (N) comprise any sort of entity (e.g., databases, websites, etc.) that can store files such as text documents, multi-media, web pages and other files that can be indexed by search engine(s) 108. Search engine(s) 108 has previously indexed a plurality of files from content providers 106 (1) and 106 (N) and returns search results with corresponding URLs to users 102.

FIG. 1 also illustrates a developer 110 operating a computing device 112. In this non-limiting example, developer 110 uses device 112 via network 104 to communicate to search engine(s) 108. The developer 110 may then refine the anchor text weights associated with web pages and execute other related applications such as creating an anchor document and re-ranking search results 114. In other embodiments, these tasks can be run on multiple devices locally, run remotely or run on a combination thereof.

As illustrated, search engine(s) 108 includes one or more processors 116, as well as memory 118, upon which a refinement engine 120 may reside. Refinement engine 120 serves to adjust anchor text weights and rank/re-rank search results according to the new weights as illustrated in result 114.

For instance, when a user 102 submits a search query to search engine(s) 108, the resulting search results may be ranked/re-ranked by refinement engine 120. Specifically in one embodiment, refinement engine 120 ranks/re-ranks search results (such as a destination page) that include the anchor text. This ranking/re-ranking is based on the anchor text weight which is a reflection of relationships between the destination page the anchor text is used in and the destination page's link to an anchor text source site and/or other source sites. Based on these relationships, the refinement engine ranks/re-ranks search results which produces more relevant search results that discount misleading links from mirror sites and/or sites with cooperative relationships.

In the non-limiting architecture of FIG. 1, refinement engine 120 is executed on search engine(s) 108. Refinement engine 120 may include link data extraction engine 122, anchor processing engine 124, anchor model engine 126 and web search ranking engine 128, each of which are discussed in detail below.

An Introduction to Anchor Texts and Example Refinement Engine

Figure 2:
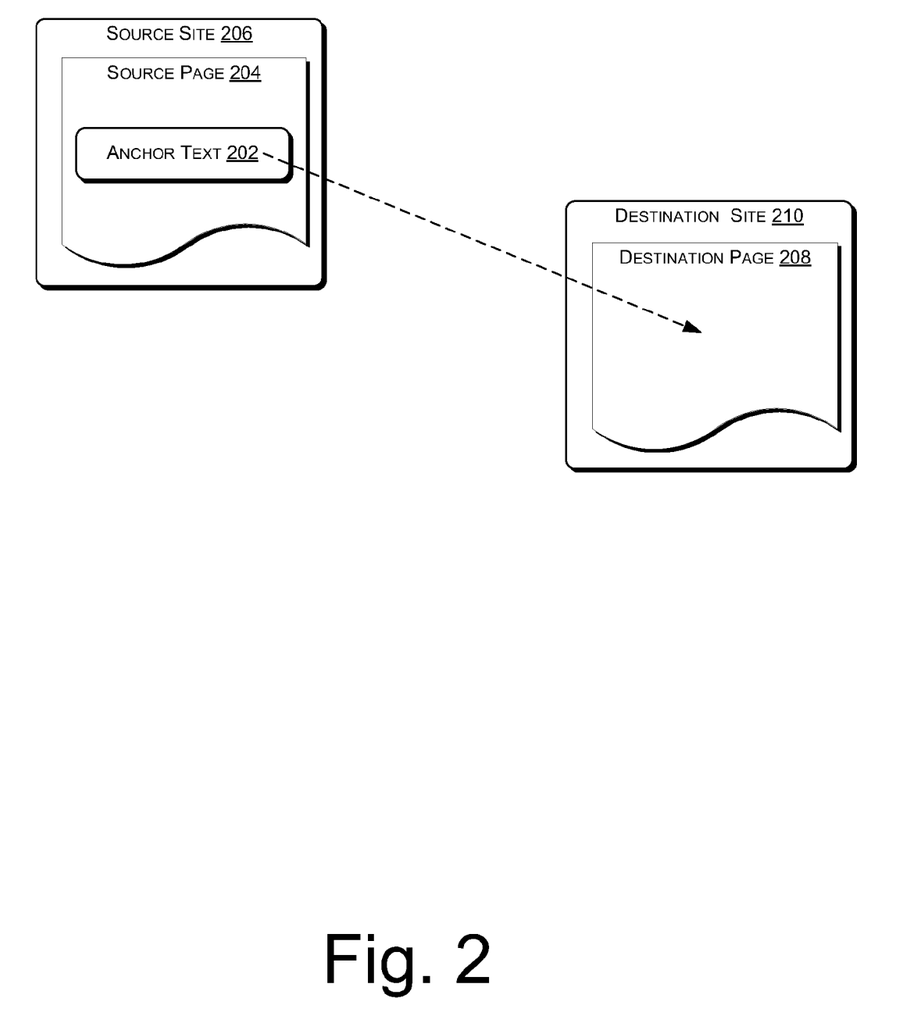
FIG. 2 illustrates a relationship between a source site and a destination site via an anchor text.

FIG. 2 illustrates an example of an anchor text link between a source site and destination site. As is known, anchor text comprises the visible and clickable text of a hyperlink and is often found underlined within a webpage. Anchor texts are primarily created to help users navigate from webpage to webpage via links. Anchor texts may be used for navigation when a user selects a source webpage anchor text and is linked to a destination webpage. For example in FIG. 2, an example anchor text 202 is visible to a user. The anchor text 202 may be included in a source page 204 which is in a source site 206. The anchor text 202 is selectable by the user and, upon user selection, takes the user to a destination page 208 which is in destination site 210 via a link (via its hyperlink structure).

Anchor texts also typically provide an additional description of the document contents. Specifically, anchor texts in web pages may be used to provide a short description of the destination website.

More specifically, anchor texts are usually short and descriptive and frequently provide a better chance to match a user query than even the content in the linked destination site.

In one example, the anchor text "ACM Conference Style" occurs in a document source page http://www.acm.org/sigs/publications/proceedings-templates. This source page belongs to the source site sigir2009.org. The HTML source for the anchor text may be: submitted papers should be in the <a href=http://www.acm.org/sigs/publications/proceedings-templates> ACM Conference style</a>.

Typically, the anchor text may be selected by the user (e.g. by a user mouse click or otherwise) to link to a destination page like http://www.acm.org/sigs/publications/proceedings-templates plates which has a destination site "acm.org".

In one embodiment, a source page serves to link to one or more different destination pages using one or more anchor texts. A destination page may also be linked by several source pages using different anchor texts. As introduced above, rather than inferring an importance (or relevancy) from the number of times an anchor text occurs, refinement engine 120 may instead focus on the number of source sites (and their relationships) linking to the destination site.

Figure 3:
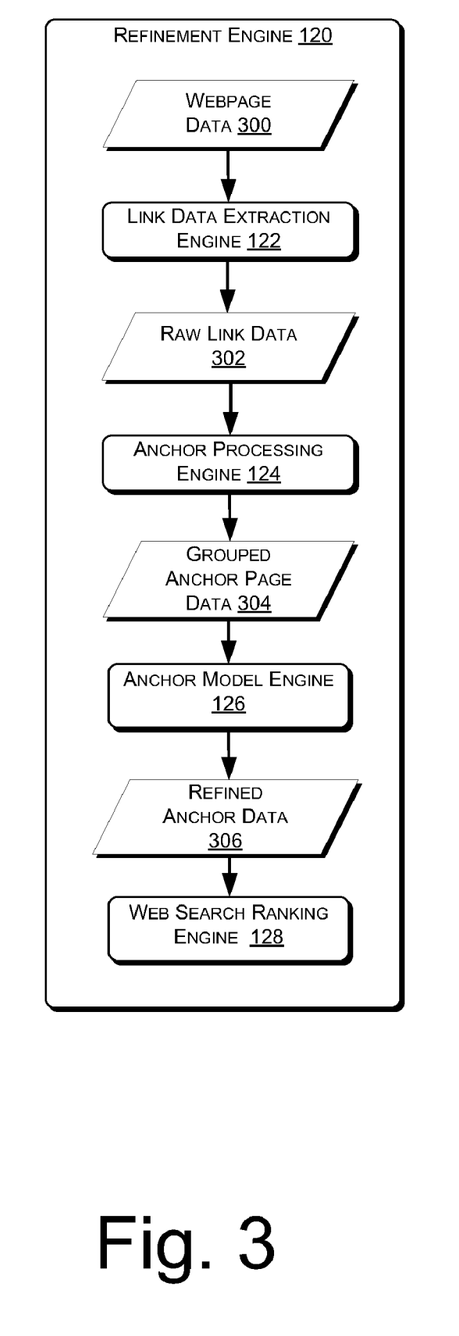
FIG. 3 illustrates example components of a refinement engine originally illustrated in FIG. 1.

FIG. 3 illustrates a non-limiting architecture of refinement engine 120 and an example of how this engine alters weights assigned to anchor texts for the purpose of generating better search results.

First, search engine(s) 108 and/or the device 112 of developer 110 gathers webpage data 300 from content providers 106(1)-(N) and/or or other sources, either in response to receiving a search query (in online embodiments) or in advance of receiving a search query (in offline embodiments). Link data extraction engine 122 then extracts anchor text links from the associated anchor texts that reside in webpage content 300 (i.e., the raw web pages). Link data extraction engine 122 then outputs raw link data 302, which comprises source pages, destination pages, source domains and destination domains. Then, anchor processing engine 124 processes the extracted raw link data 302 and generates grouped anchor data 304 used by the anchor model engine 126 (discussed below). Anchor model engine 126 may then output adjusted anchor text weights in a general meta data format such as <phrases, weight> pairs for each webpage (refined anchor data 306). This data may then be used to rank or re-rank search results provided by search engine(s) 108 or other sources via web search ranking engine 128. By ranking or re-ranking search results, refinement engine 120 generally returns search results that more closely match a search than when compared with traditional techniques.

Anchor Documents

In one embodiment, the anchor texts are used in search engine results ranking/re-ranking via anchor documents. In some instances, an anchor document may be formed from a collection of anchor texts to form a "pseudo" document. Specifically an anchor document is built for a destination page of the anchor text in anchor model engine 126. For example, given a destination page d, an anchor document may contain all the unique anchor texts of a destination page's (d) incoming links (that is, all of the anchor texts associated with hyperlinks that link to page d). In addition, each anchor text $a_i$ is associated with a weight $f(a_i, d)$. In this embodiment, the anchor text $a_i$ is treated as a phrase and $f(a_i, d)$ is considered as its frequency (importance/relevancy) in the anchor document. In this embodiment, the anchor document may be represented via: $f(a_1, d)\times$anchor text 1, $f(a_2, d)\times$anchor text 2 . . . $f(a_i, d)\times$anchor text i . . . $f(a_n, d)\times$anchor text n.

In previous methods the definition of f(a, d) was simply defined as the number of links to d via anchor text a. In other words, the f(a, d) was defined as the number of pages that page d links to. As discussed above, this definition can provide poor search results in the situations discussed above.

To compensate, in one embodiment, the definition of f(a, d) should satisfy the following requirement: if the query is the anchor text a, the pages that are directly linked by the anchor text should be correctly ranked. In other words, the more relevant results should be ranked higher than the less relevant results.

For example in one embodiment, let p(d|a) be the probability that a destination document (e.g. destination page) d is authoritative for anchor text a, p(a) is the probability that anchor text a is used on the web, and p(a,d) is the probability that an anchor-document pair <a,d> is important on the web. The weight f(a,d) should be approximately proportional to $p(a,d)=p(a)\cdot p(d|a)$ in order to allow more authoritative documents to be ranked higher when the query is the same as anchor text a. Thus, the general form of the weighting function f(a,d) for an anchor text a and a destination page d is:

$$(a,d)=p(a)\cdot p(a,d) \propto p(a)\cdot d|a)$$

Anchor model engine 126 may in one embodiment adjust the weight of anchor texts by estimating f(a,d) and p(a,d). This engine first calculates the anchor weight f(a,d) using p(a,d) and multiplier "c" (to generate integral values of f(a, d)). Then anchor documents are generated based on these results. c may be set as a constant in most retrieval models using anchor texts because it is typically the same for any anchor and document pair and may be discarded in the search result ranking. As an anchor document is constructed for a destination page, various ranking models may be used to index the anchor texts and perform retrievals.

In the following examples, "D" stands for the page corpus comprising all web pages, "a" denotes all anchor texts and "S" denotes a set of multiple websites. Also, implicitly, p(a, d)=p(a, D, d) because p(a,d) is estimated solely based on D in one embodiment.

The following table also includes definitions for the examples that follow here A is an Anchor, P is a page and S is a site:

| | |
|---|---|
| APPages(a, d): | The pages which link to destination page d using anchor text a. |
| APSites(a, d): | The sites which have at least one page linking to d using a. |
| PSrcSites(d): | The set of domains which have at least one page linking to d. |
| ASrcPages(a): | The pages which use anchor text a to link to other pages. |
| ASrcSites(a): | The domains which have at least one source page containing a |
| ADstPages(a): | The destination pages linked by a. |
| SDstSites($s_s$): | The sites linked by site $s_s$. |
| SSrcSites($s_d$): | The sites linking to site $s_d$. |
| S2SDstPages($s_s$, $s_d$): | The pages from site $s_d$ that are linked by pages from site $s_s$. |

The Site-Relationship Model

The site relationship model as contained in anchor model engine 126 serves to adjust an anchor text weight by considering the dependencies of websites (e.g. mirror site dependencies etc.). For instance, in previous applications of searching with anchor texts, many less relevant search results belonged to dependent websites. Thus repetitive use of anchor texts on dependent web pages produced less relevant results, while the sparse use of anchor texts on relevant web pages penalized more relevant web pages. The site-relationship model remedies these deficiencies by addressing various dependencies discussed below.

The first kind of dependence considered by anchor model engine 126 is the relationship between a source site and a destination site. Specifically, an anchor text link between these websites may not be as reliable as other links if the source site is dependent on the destination site. In one embodiment, it is assumed that the source site $s_s$ is dependent on the destination site $s_t$ if $s_s$ links to a plurality of pages in $s_t$.

For instance, suppose S2SDstPages($s_s$,$s_t$) (the pages from site $s_t$ that are linked by site $s_s$), then c($s_s$,$s_t$) defined immediately below, may be used to estimate the weight that $s_s$ is dependent on $s_t$.

$$c(s_s, s_t) = \frac{1}{1 + \log|S2SDstPages(s_s, s_t)|}$$

Above, c($s_s$,$s_t$) is essentially an expression of the weighted relationship between a destination and source site ($s_s$ and $s_t$). A small value of c($s_s$,$s_t$) may be observed when $s_s$ is a mirror site or cooperative site of $s_t$. This weight will discount the weight that a destination site receives from mirror anchor texts. This discount aids in providing more relevant search results because mirror sites frequently link back to its main domain with many links. Thus this adjustment will stop sites from generating a plurality of links to pages in its cooperative or mirror site to simply to boost their search result rankings.

Figure 4:
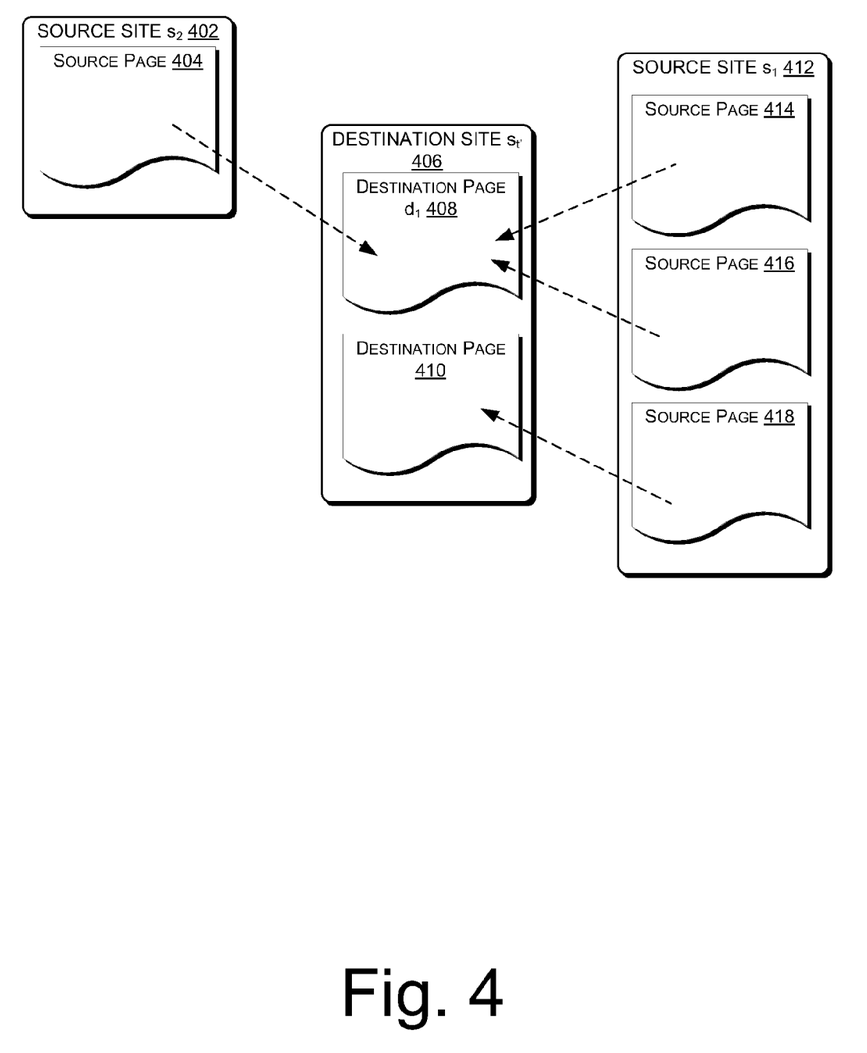
FIG. 4 depicts destination site and source site relationships between documents having anchor texts.

FIG. 4 illustrates example relationships between source sites and destination sites. Here, the c($s_s$,$s_t$) values are calculated demonstrating a value difference based on the different relationships. For instance, c($s_2$,$s_t$)=1 in which source site $s_2$ 402 has one source page 404 linking (indicated via a dashed line) via an anchor text (not shown) to destination page $d_1$ 408 in destination site $s_t$ 406. Destination site $s_t$ also has a second page 410. Here, since there is only one anchor text link in between 402 and 406 and, therefore, c($s_2$,$s_t$)=1.

FIG. 4 also illustrates c($s_1$,$s_t$)=1/(1+log 2) which is smaller than 1. Here, source site $s_1$ 412 has pages 414 and 416 linking to destination page $d_1$ 408 in destination site $s_t$ 406 and source page 418 links to destination page 410 in destination site $s_t$ 406. The c($s_1$,$s_t$) is smaller than 1 due to the dependency between $s_t$ and $s_1$ via pages 408, 410, 414, 416 and 418.

Thus, dependent sites with a mirror site and/or cooperative source site relationship have discounted anchor weights while non-dependent and non-cooperative sites do not have discounted anchor text weights The second kind of dependence considered by anchor model engine 126 is the relationship between source sites themselves. This engine serves to compensate for several dependency situations. A first situation occurs with mirror source sites or copied pages. A second situation is when some source sites have a common destination site and the source sites are owned and designed by the same users who execute search engine optimization. A third situation is when links are added in a source site by an untrusted third party such as a spammer Often these misleading links are hard to detect as they are added to the webpage via invisible blocks.

In this second dependency, the anchor model engine assumes that the source sites are dependent on another source site if their links strongly overlap. For instance, websites would overlap if they linked to identical or similar sites. For example, if S1 links to 10 destination sites and S2 links to 9 of those same sites then the source sites S1 and S2 may be deemed as strongly overlapping one another.

For example, for a specific page d, suppose PSrcSites(d) are the websites linking to d. SDstSites(s) is the set of websites pointed by site s. If sites PSrcSites(d) link to duplicated web pages or websites, the anchor text weight should be discounted while estimating the authority (relevancy) of the destination pages.

Figure 5:
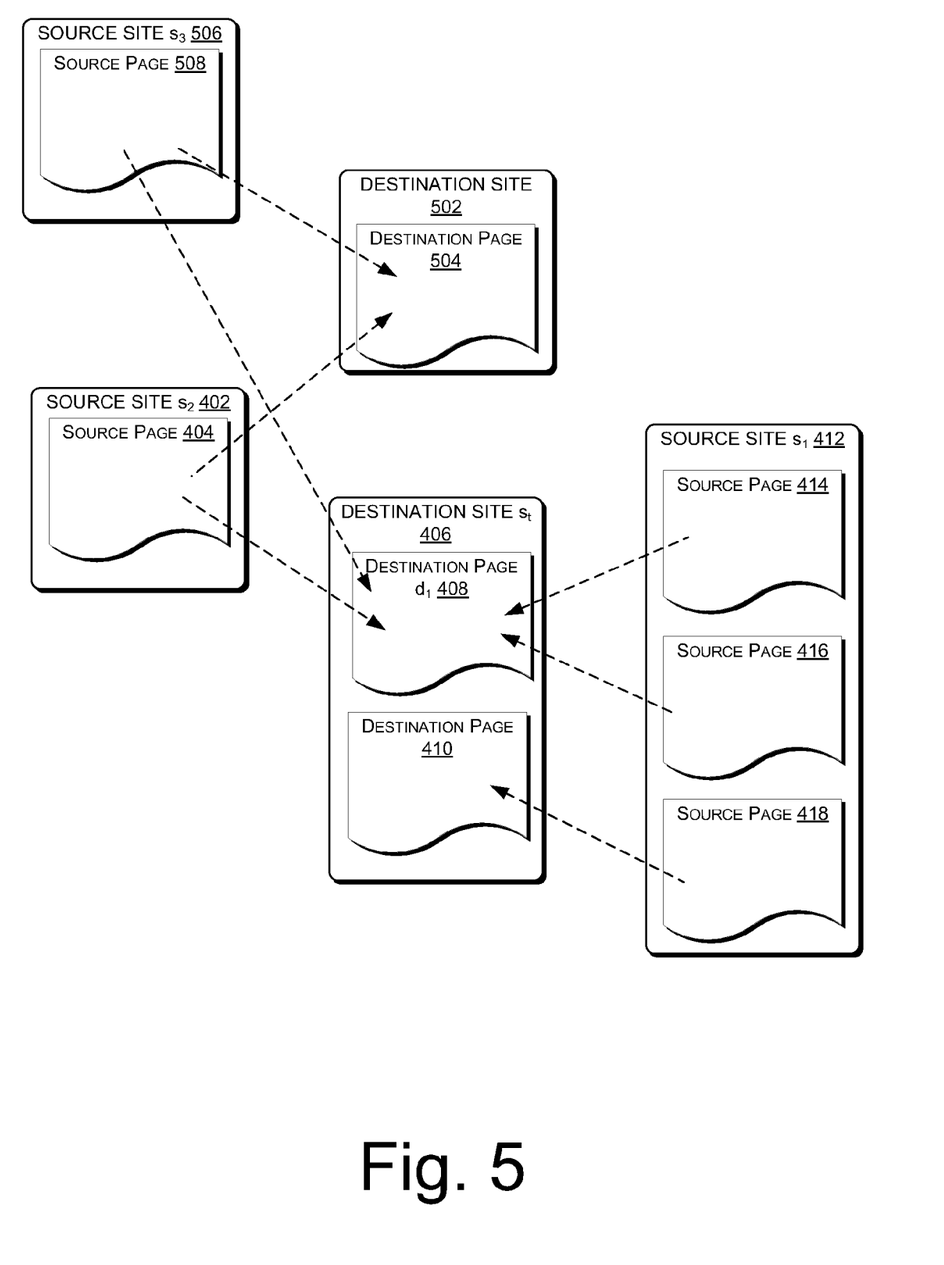
FIG. 5 depicts multiple source site relationships between documents having anchor texts.

As illustrated in FIG. 5, source site $s_3$ 506 (with source page 508) and source site $s_2$ 402 link to same destination site 502 and destination site 406, the anchor texts weights in sites 506 and 402 will be lowered. The rational for this discount is that the same or a similar list of target (or destination) web pages are used. A potential explanation for this behavior is that Web spammers usually want to boost a large number of pages using the limited resources (e.g. source websites or human editors) available to the spammer. Thus, an efficient way to spam is to insert the same list or very similar lists of links that are desired to be boosted into all the pages the spammer has created, maintained or attacked. However, recognizing this relationship and discounting the anchor text weight will counteract this tactic.

Since it is costly to calculate the relationship between two arbitrary websites, the probability that destination page $d_t$ is linked by a group of related sites is simplified to:

$$l(d_t) = \frac{\epsilon + \sum_{s \in \cup_{s_s \in PSrcSites(dt)} SDstSites(s_s), s \neq s_t} idf(s)}{\epsilon + \sum_{s_s \in PSrcSites(d_t)} \sum_{s \in SDstsites(s_s), s \neq s_t} idf(s)}$$

Here, $\cup_{s_s \in PSrcSites(dt)} SDstSites(s_s)$ is the set of sites linked by the source sites of $d_t$. $\Sigma s_{s \in PSrcSites(d_t)} \Sigma_{s \in SDstsites(s_s)}$ equals the number of <site,site> pairs. $s_t$ stands for the site of the page $d_t$ and it is excluded when l($d_t$) is calculated.

$$idf(s) = \log \frac{|S| + 0.5}{|SSrcSites(s)| + 0.5},$$

serves to reduce the negative impact of popular websites. In one embodiment, it is assumed that a group of websites is strongly dependent only if the sites linked by them overlap and are unpopular. This is because popular websites may normally be linked by many websites together. Here, $\epsilon$ is a smoothing parameter and $\epsilon$=10E-8 in one embodiment.

In FIG. 5, it is assumed that each idf value of the destination sites $s_t$, and $s_t$ equal to 1. Here, $$l(d_1) = \frac{\epsilon + 1}{\epsilon + 0 + 1 + 1} \approx .5 \text{ and}$$

$$l(d_2) = \frac{\epsilon + 0}{\epsilon + 0} = 1.$$

These values reflect how unique a destination is linked and how important each link is to a destination page.

The site relationship model in anchor model engine 126 considers both the first and second dependencies above. The model assumes that different websites may have different weights for voting to the relevancy of a destination page. Stated otherwise, this model assumes that: $p_{sx}(a,s,d_t) \neq$ constant.

Suppose p"(a,$s_t$, $d_t$) is the constant contribution of an anchor text link from source site s to destination page $d_t$. In one embodiment, different weights are added to this contribution considering different relationships between websites via:

$$p_{sx}(a, D, d_t) = \sum_{s \in APSites(a,d_t)} p^n(a, s, d_t) \cdot c(s, s_t) \cdot l(d_t)$$

$$p_{sx}(d_t \mid a, D) = \frac{l(d_t)\sum_{s_s \in APSites(a,d_t)} c(s_s, s_t)}{\sum_{d \in ADstPages(a)} l(d)\sum_{s_{s'} \in APSites(a,d)} c(s_{s'}, s_d)}.$$

Here, $p_{sx}(d_t|a,D)$ is abbreviated as SiteProbEx.

Thus, in FIG. 5, $c(s_1,s_t)=1/(1+\log 2)$, $c(s_2,s_t)=1$, $c(s_3, s_t)=1$, $c(s_o,s_{t'})=1$, $l(d_1)=0.5$ and $l(d_2)=1$ yields:

$$p_{sx}(d_1 \mid a) = \frac{0.5 \times (1+1+1/(1+\log 2))}{0.5 \times (1+1+1/(1+\log 2)) + 1 \times 1} \approx .5643,$$

and $p_{sx}(d_2|a)=0.4357$. Thus, $p_{sx}(d_1|a)$ is just slightly larger than $p_{sx}(d_2|a)$ despite the fact that it is linked by two more sites.

Therefore, the site relationship model can account for relationships between websites via the adjusted anchor text weight. As these example numbers illustrate, this model aids in ranking more relevant websites higher than less relevant websites.

Illustrative Processes

Figure 6:
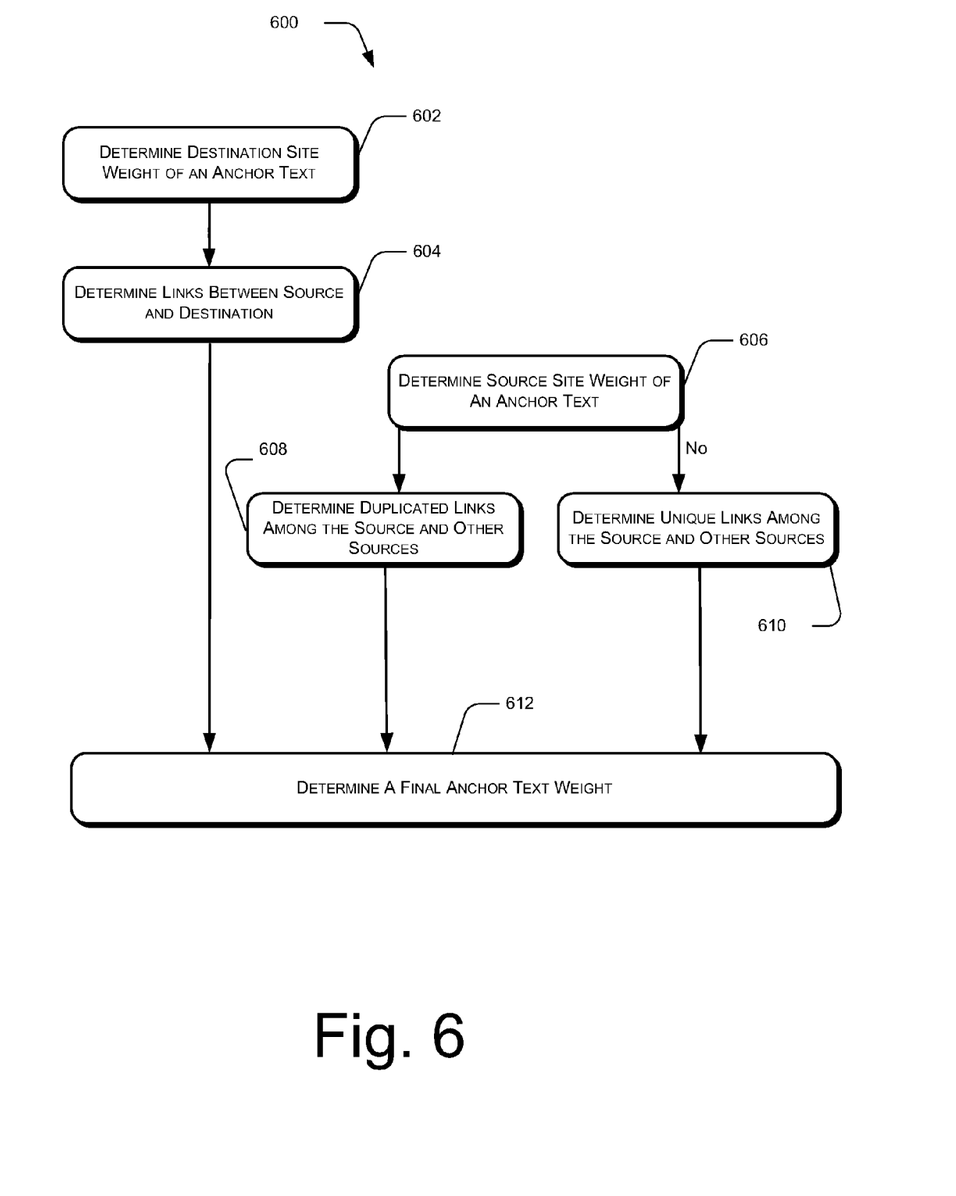
FIG. 6 depicts example operations to adjust an anchor text weight to produce better search results in the architecture of FIG. 1 or in other architectures.

FIG. 6 describes an example process 600 for employing the techniques discussed above. Specifically, FIG. 6 presents an illustrative process for adjusting anchor text weights based on the relationships of destination and source sites. This process is illustrated as a logical flow graph, which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 600 includes an operation 602, which determines a destination/source site weight of an anchor text associated to a source site. To do so, operation 604 may count a number of links between the source site and destination site associated with the anchor text. As discussed above, these steps determine destination/source site dependencies which if remain unconsidered, may lead to inaccurate anchor text weights.

In operation 606, which may be executed with or without steps 602-604, a determination is made regarding an anchor text source/other source site weight. This may feature operation 608, in which the number of duplicated links among the source site and other source sites is determined. In addition, operation 606 may feature operation 610, in which a determination is made regarding the number of unique links between the source site and other source sites. As discussed above, dependencies among source sites can lead to inaccurate anchor text weights.

Finally at operation 612, the final anchor weight is determined. This may include the resulting weights from operations 602-604 and 606-610. In this embodiment, the final weight considers both the destination/source site weights and the source site weights. In other embodiments, only one of the destination/source or source/other source site weight is considered when determining a final anchor text weight. In each embodiment, meanwhile, the final weight may be used in weighting documents in response to receiving a search query for the purpose of providing more relevant search results in response to receiving the query.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable storage media comprising computer-program instructions that, when executed, cause one or more processors to perform acts comprising:
   determining a number of links on a source site that point to a destination site;
   calculating a destination site weight of an anchor text on the source site that links to the destination site based at least in part on the determined number of links, wherein the destination site weight of the anchor text is relatively higher when it is determined that the source site has a relatively fewer number of links that point from the source site to the destination site and the destination site weight of the anchor text is relatively lower when it is determined that the source site has a relatively larger number of links that point from the source site to the destination site;
   determining a number of duplicated links between the source site and multiple other source sites that also link to the destination site;
   determining a number of links between the source site and the multiple other source sites that are not duplicated links;
   calculating a source site weight of the anchor text based at least in part on the determined number of duplicated links and the determined number of links that are not duplicated links;
   calculating a final weight of the anchor text based at least in part on the destination site and source site weights;
   storing the final weight of the anchor text in association with the anchor text and a destination page of the destination site to which the anchor text links; and
   re-ranking the destination page within a list of destination pages produced by search engine results based at least in part on the final weight.

2. The one or more computer-readable storage media of claim 1, further comprising:
   creating an anchor document comprising multiple anchor texts and associated weights; and
   associating the anchor document with the final weight of the anchor text and a page of the destination site to which the anchor text links.

3. The one or more computer-readable storage media of claim 2, further comprising re-ranking a list of destination pages produced by search engine results based at least on the multiple anchor text weights of the anchor document.

4. The one or more computer-readable storage media of claim 1, wherein the source site and the multiple other source sites each link to a common page on a destination site.

5. The one or more computer-readable storage media of claim 1, wherein at least one of the links is a hyperlink.

6. The one or more computer-readable storage media of claim 1, further comprising:
   calculating a probability that a destination page of the destination site is linked to the source site and to the multiple other source sites; and
   determining a set of domains that have at least one page linking to the destination page;
   and wherein the calculating of the source site weight is further based at least in part on the calculated probability and the determined set of domains.

7. One or more computer-readable storage media comprising computer-program instructions that, when executed, cause one or more processors to perform acts comprising:
- determining a number of links on a source site that point to a destination site;
- calculating a destination site weight of an anchor text on the source site that links to the destination site based at least in part on the determined number of links;
- determining a number of duplicated links between the source site and multiple other source sites that also link to the destination site;
- determining a number of links between the source site and the multiple other source sites that are not duplicated links;
- calculating a probability that a destination page of the destination site is linked to the source site and to the multiple other source sites;
- calculating a source site weight of the anchor text based at least in part on the determined number of duplicated links, the determined number of links that are not duplicated links, and the calculated probability;
- calculating a final weight of the anchor text based at least in part on the destination site and source site weights;
- storing the final weight of the anchor text in association with the anchor text and a destination page of the destination site to which the anchor text links; and
- re-ranking the destination page within a list of destination pages produced by search engine results based at least in part on the final weight.

8. The one or more computer-readable storage media of claim 7, further comprising:
- creating an anchor document comprising multiple anchor texts and associated weights; and
- associating the anchor document with the final weight of the anchor text and a page of the destination site to which the anchor text links.

9. The one or more computer-readable storage media of claim 8, further comprising re-ranking a list of destination pages produced by search engine results based at least on the multiple anchor text weights of the anchor document.

10. The one or more computer-readable storage media of claim 7, wherein the source site and the multiple other source sites each link to a common page on a destination site.

11. The one or more computer-readable storage media of claim 7, wherein at least one of the links is a hyperlink.

12. The one or more computer-readable storage media of claim 7, wherein the destination site weight of the anchor text is relatively higher when it is determined that the source site has a relatively fewer number of links that point from the source site to the destination site and the destination site weight of the anchor text is relatively lower when it is determined that the source site has a relatively larger number of links that point from the source site to the destination site.

13. The one or more computer-readable storage media of claim 7, further comprising:
- determining a set of domains that have at least one page linking to the destination page;
- wherein the calculating of the source site weight is further based at least in part on the determined set of domains.

14. A computing device comprising:
- a processor; and
- a memory coupled to the processor, the memory comprising computer-program instructions executable by the processor for:
  - determining a number of links on a source site that point to a destination site;
  - calculating a destination site weight of an anchor text on the source site that links to the destination site based at least in part on the determined number of links;
  - determining a number of duplicated links between the source site and multiple other source sites that also link to the destination site;
  - determining a number of links between the source site and the multiple other source sites that are not duplicated links;
  - calculating a source site weight of the anchor text based at least in part on the determined number of duplicated links and the determined number of links that are not duplicated links, wherein the source site weight of the anchor text is relatively higher when the determined number of duplicated links is relatively lower and the source site weight of the anchor text is relatively lower when the determined number of duplicated links is relatively higher;
  - calculating a final weight of the anchor text based at least in part on the destination site and source site weights;
  - storing the final weight of the anchor text in association with the anchor text and a destination page of the destination site to which the anchor text links; and
  - re-ranking the destination page within a list of destination pages produced by search engine results based at least in part on the final weight.

15. The computing device of claim 14, wherein the memory further comprises computer-program instructions executable by the processor for:
- creating an anchor document comprising multiple anchor texts and associated weights; and
- associating the anchor document with the final weight of the anchor text and a page of the destination site to which the anchor text links.

16. The computing device of claim 15, wherein the memory further comprises computer-program instructions executable by the processor for re-ranking a list of destination pages produced by search engine results based at least on the multiple anchor text weights of the anchor document.

17. The computing device of claim 14, wherein the source site and the multiple other source sites each link to a common page on a destination site.

18. The computing device of claim 14, wherein at least one of the links is a hyperlink.

19. The computing device of claim 14, wherein the destination site weight of the anchor text is relatively higher when it is determined that the source site has a relatively fewer number of links that point from the source site to the destination site and the destination site weight of the anchor text is relatively lower when it is determined that the source site has a relatively larger number of links that point from the source site to the destination site.

20. The computing device of claim 14, wherein the memory further comprises computer-program instructions executable by the processor for:
- calculating a probability that a destination page of the destination site is linked to the source site and to the multiple other source sites; and
- determining a set of domains that have at least one page linking to the destination page;
- and wherein the calculating of the source site weight is further based at least in part on the calculated probability and the determined set of domains.

* * * * *